Aug. 28, 1951     E. G. JOHNSON     2,565,770
FLEXIBLE COUPLING
Filed May 15, 1946
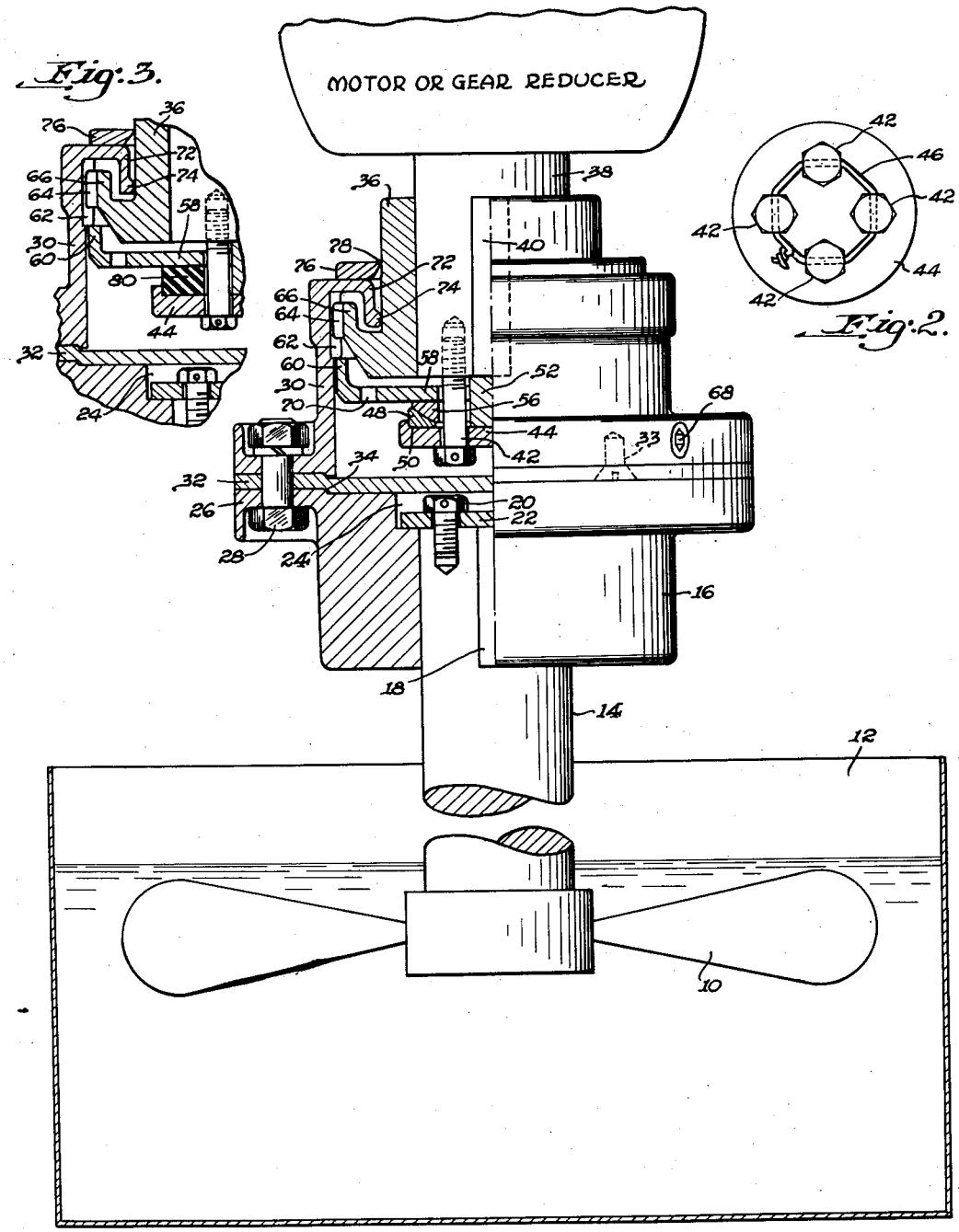
INVENTOR
EDGAR G. JOHNSON Patented Aug. 28, 1951

2,565,770

UNITED STATES PATENT OFFICE 2,565,770

FLEXIBLE COUPLING

Edgar G. Johnson, Park Ridge, Ill., assignor to Koppers Company, Inc., Pittsburgh, Pa., a corporation of Delaware Application May 15, 1946, Serial No. 669,963

7 Claims. (Cl. 64—9)

This invention relates to couplers. More particularly the invention relates to couplings for vertical shafts wherein there is vertical thrust on the coupler.

Experience has shown that the wear and strain on a vertical driving shaft and its bearings may be greatly reduced if the stirrer, propeller, centrifugal or the like which is attached to the lower end of a shaft is connected with the driving shaft through a vertical thrust coupling. The coupling will take care of a non-alignment of the shafts and will absorb the strains resulting from anything which tends to move the shafts to which the stirrer or the like is attached, out of vertical alignment with the driving shaft.

The primary object of the present invention is to provide a coupler for vertical shafts with a vertical thrust bearing.

Another object of the invention is to provide a vertical thrust coupler that may be effectively lubricated.

A further object of the invention is to provide a coupler for vertical shafts which is adapted for thrust operation and which is simple and cheap in construction.

With these and other objects in view the invention consists in the vertical thrust coupling hereinafter illustrated and described and particularly defined in the annexed claims.

The important features of the invention are illustrated in the accompanying drawings in which:

Figure 1 is a view in elevation with parts in section, of a stirrer coupled to the lower end of a vertical drive shaft with the coupler of the present invention;

Figure 2 is a plan view of the bolts by which the coupling members may be locked in fixed position to the ends of the vertical shafts; and, Figure 3 is a fragmentary view in elevation, with the parts in section, of the coupler, illustrating another form of flexible thrust bearing therein.

The coupling shown in the drawings is illustrated for the purpose of connecting a vertical shaft for a stirrer with a vertical driving shaft that is gear- or motor-driven. The stirrer 10 which is attached to the lower end of a lower vertical shaft is shown as suspended in a tank 12. With some types of stirrers it is necessary to have a bearing in the tank at the lower end of the tank but with light weight stirrers this is not necessary. The upper end of the shaft 14 is fixed in a lower hub 16 by means of a key 18 and bolts 20. The key 18 is fitted into keyways in the hub 16 and shaft 14 and provides for the rotation of the shaft 14 with the hub 16. The bolts 20 secure a plate 22 to the upper end of the shaft 14 and the plate 22 fits in a socket 24 in the upper end of the hub 16. The hub 16 has an outwardly projecting flange 26 to which is secured, by means of bolts 28, a coupling cylinder 30. Although one bolt 28 is illustrated, eight or more bolts depending upon the size of the coupler, are used in holding the members 16, 30 and an oil plate 32 together. The oil plate 32 fits on top of the hub 16 and has offset faces 34 closely fitted with the top of the hub 16 and the bottom of the cylinder 30 by which an oil-tight connection may be secured. The oil plate 32 is normally secured to the lower face of the flange of the cylinder 30 by means of a series of screws 33 which are distributed around the flange. The cylinder 30 surrounds an upper hub flange 36 that is fixed for rotation on the lower end of an upper driving shaft 38 by means of a key 40. The key fits in keyways formed in the hub 36 and shaft 38.

The lower hub 16 and cylinder 30 form the lower portion of the coupler while the upper hub 36 with its connected parts forms the upper portion of the coupler. The upper hub 36 is fixed to the lower end of the shaft 38, which shaft also carries a bearing carrier plate 44 by means of bolts 42, four bolts being utilized as illustrated in Figure 2. The bolts pass through the plate 44 and are threaded into the lower end of the shaft 38. Each of the bolts 42 has a hole drilled therethrough and a wire 46 is passed through the four bolts as illustrated in Figure 2 to lock the bolts against rotation to prevent their being loosened. The same wire tieing construction for locking the bolts against rotation in the upper end of the shaft 14 is used in connecting the shaft 14 with the hub 16.

A flexible bearing, comprising a lower bearing ring 48 and an upper bearing ring 56, is mounted in a seat 50 on the upper face of the bearing carrier plate 44. The upper face of the bearing ring 48 is ground to provide a spherical surface. The bearing ring 48 forms the lower portion of a thrust bearing upon which the upper and lower portions of the coupler may move relatively to one another in providing for non-alignment of the vertical shafts 16, 38. A block 52 is mounted at the lower end of the upper shaft 38 between the lower end of the shaft 38 and the bearing carrier plate 44 to provide a space in which the spherical bearing rings are mounted. An upper bearing ring 56 has a spherical surface on its underface which cooperates with the spherical face of the lower bearing ring 48 to form the upper half of the flexible thrust bearing. The upper bearing ring 56 supports the inner peripheral edge of an axial thrust plate 58 which has an upwardly turned peripheral flange 60 that bears annularly and axially from below against splines 62 formed on the inner face of the cylinder 30 near the upper inner end thereof. The bolt holes in the axial thrust plate 58 through which the bolts 42 pass are comparatively large for angular adjustment of the plate 58 within the coupling to provide movement of the lower portion of the coupling, that is the bearing ring 56, plate 58, cylinder 30 and hub 16 relatively to the lower flexible bearing ring 48, carrier plate 44, spacer 52, bolts 42, and shaft 38, as well as the upper hub 36. The elements 52, 44 and 48, while held tightly in place with shaft 38 by bolts 42, are separately connected, and elements 48 and 44 are also spaced from bolts 42 for shifting movement relative thereto. To connect the two parts of the coupler for movement in unison, an annular series of teeth or splines 64 are formed on an outwardly extending flange 66 secured to the upper hub 36, the splines 64 cooperating with the annular series of teeth or splines 62 on the cylinder 30. The splines 62 are much longer than the splines 64 to permit the relative axial movement of the two parts of the coupler.

An opening 68 is formed in the flange at the bottom of the cylinder 30 which is arranged to receive a fitting, such as "Alumnite" or "Zirk" fitting, by which liquid or semi-liquid lubricant may be pumped into the chamber formed in the cylinder above the oil plate 32. Holes 70 are formed in the plate 58 by which lubricant may be passed up into the splines 62 and 64.

To prevent lubricant from escaping from the chamber within the coupler an inwardly extending flange 72 is formed on the upper end of the cylinder and on the lower end of this flange is formed a spherical face 74 which maintains a point contact with the outer surface of the hub 36. This contact point is at the oscillation center of the upper hub splines and is maintained when the two parts of the coupler move relatively to each other to provide for alignment of the shafts. The point contact 74 is also lubricated by the lubricant which is forced into the chamber through the inlet 68 and serves as a radial bearing for holding the crowns of the splines 62, 64 out of radial bearing relation. To prevent dust and dirt from working into the coupler a dust ring 76 is loosely mounted on the upper face of the flange 72 and has a point contact 78 which makes a snug fit with the outer face of the hub 36.

In Figure 3 is illustrated a modified form of a coupler wherein a yieldable rubber flexible bearing 80 is mounted so as to be interposed between the bearing carrier plate 44 and the axial thrust plate 58 to replace the spherical flexible thrust bearing members 48 and 56, as illustrated in Fig. 1. The rubber ring 80 is preferably made of a vulcanized rubber which is oil-insoluble and sold under the trade name of Neoprene. This rubber ring will support comparatively high thrusts and still is yieldable and flexible enough to permit the shafts 14 and 38 to adjust themselves for misalignment.

As the thrust load is increased the size of the bolts 42 and 20 may be increased and the size of the spherical bearings 48, 56, may be increased. It will be understood, furthermore, that the steel spherical bearing seats are designed so that the center of the sphere coincides with the center of the upper shaft 38 at the point of intersection of a horizontal line passing through the center of the coupling gear teeth (62, 64) engagements.

In operation with the coupling in place on vertical shafts, when the upper shaft 38 is rotated the lower shaft 14 is driven by means of the driving relation established between the annular series of teeth 64 on the upper hub and the annular series of teeth 62 on the cylinder 30, the intermeshing teeth rotating with the upper hub fixed to the driving shaft 38 and turning the sleeve or cylinder 30, which in turn rotates the lower hub 16 which is fixed to the lower shaft 14 and thus rotates the lower shaft 14 and the agitator 10.

For suspending the shaft 14 and its agitator 10, the lower hub 16, and the sleeve or cylinder 30, from the upper shaft 38, while still permitting angular adjustment due to misalignment of the upper and lower shafts 38, 14, with a simple, more economical and facile construction and assembly, the axial thrust plate 58 is employed to annularly supportingly engage with the annular series of teeth 62 on the cylinder 30, axially of the shafts from below the teeth.

This plate 58 is carried by the plate 44 which is also a bearing carrying plate, and so is disposed below the axial thrust plate 58 for suspending the axial thrust plate 58 from the upper shaft.

For this, the bearing carrying plate 44 is carried by the upper shaft to which it is fixed by means of bolts 42 and a spacer block 52. The axial thrust plate 58 is mounted on the bearing carrying plate 44 for angular adjustment by having it freely encircle bolts 42 and by having it supported on a flexible bearing interposed between the two plates 58 and 44, preferably in the form of two superimposed spherical thrust bearing rings 48 and 56 which flexibly support the axial thrust plate 58 on the bearing carrying plate 44.

The various features of the invention having been thus described, what is claimed as new is:

1. A vertical thrust coupling for connecting vertically arranged shafts comprising: an upper hub fixed to the lower end of the upper shaft; a lower hub fixed to the upper end of the lower shaft; a cylinder fixed to the lower hub and arranged to surround the upper hub; a lower bearing secured to the lower end of the upper shaft and having a spherical upper face; an upper bearing secured within the cylinder having an under spherical face cooperating with the face of the lower bearing; intermeshing teeth mounted on the inner face of the cylinder and on the outer face of the upper hub; a bearing ring secured to the upper end of the cylinder having an inner spherical face making a point contact with the outer wall of the upper hub at a point which is the oscillation center of the upper hub teeth, and in which an oil plate is clamped between the cylinder and the lower hub to provide an oil chamber for containing a lubricant to lubricate said bearings and splines.

2. A vertical thrust coupling for connecting vertically arranged shafts comprising: an upper hub fixed to the lower end of the upper shaft; a lower hub fixed to the upper end of the lower shaft; a cylinder fixed to the lower hub and arranged to surround the upper hub; a lower bearing secured to the lower end of the upper shaft and having a spherical upper face; an upper bearing secured within the cylinder having an under spherical face cooperating with the face of the lower bearing; intermeshing teeth mounted on the inner face of the cylinder and on the outer face of the upper hub; a bearing ring secured to the upper end of the cylinder having an inner spherical face making a point contact with the outer wall of the upper hub at a point which is the oscillation center of the upper hub teeth, and in which a dust ring is mounted above the bearing ring to make a snug fit with the outer surface of the upper hub and the top of the bearing ring.

3. A vertical thrust coupling for connecting vertically arranged shafts comprising: an upper hub fixed to the lower end of the upper shaft, a bearing plate attached to the lower end of the upper shaft; a lower hub fixed to the upper end of the lower shaft, a cylinder fixed to the lower hub and arranged to surround the upper hub; a thrust plate within the cylinder positioned above the bearing plate and arranged to vertically support the lower shaft; a flexible thrust bearing positioned between the plates and a splined connection between the upper hub and inner face of the cylinder.

4. The combination defined in claim 3 in which the flexible thrust bearing is an oil-insoluble rubber composition.

5. A vertical thrust coupling for connecting vertically arranged shafts comprising: an upper hub fixed to the lower end of the upper shaft, a separate bearing plate attached to the lower end of the upper shaft, a lower hub fixed to the upper end of the lower shaft, a cylinder fixed to the lower hub and arranged to surround the upper hub, a thrust plate within the cylinder positioned above the bearing plate and arranged to vertically support the lower shaft, a thrust bearing between the upper and lower plates, an oil plate clamped between the lower hub and the cylinder to provide an oil chamber to immerse the thrust bearing between the plates in oil, and a splined connection between the upper hub and the inner face of the cylinder.

6. A vertical thrust coupling for connecting vertically arranged shafts comprising: an upper hub fixed to the lower end of the upper shaft; a lower hub fixed to the upper end of the lower shaft; a cylinder fixed to the lower hub and arranged to surround the upper hub; a splined connection between the upper hub and the inner face of the cylinder comprising teeth on the cylinder and teeth on the upper hub in driving relation; a bearing carrying plate attached to the lower end of the upper shaft; an axial thrust plate within the cylinder positioned above the bearing carrying plate and carried by the latter and axially supportingly engaging the teeth on the cylinder annularly of the coupling to vertically support the lower shaft; and spherical thrust-bearing rings interposed between the bearing-carrying plate and the axial thrust plate for flexibly supporting the axial thrust plate on the bearing carrying plate.

7. A vertical thrust coupling for connecting vertically arranged shafts comprising; an upper hub fixed to the lower end of the upper shaft; a lower hub fixed to the upper end of the lower shaft; a cylinder fixed to the lower hub and arranged to surround the upper hub; a splined connection between the upper hub and the cylinder comprising an annular series of teeth on the inner face of the cylinder and an annular series of teeth on the upper hub in intermeshing driving relation with each other; an axial thrust plate angularly adjustable within the cylinder and in annular supporting engagement with the annular series of teeth on the cylinder axially from below the teeth, to vertically support the cylinder, the lower hub fixed to the cylinder, and the lower shaft fixed to the lower hub; a bearing carrying plate carried by the lower end of the upper shaft and disposed below the axial thrust plate, for suspending the axial thrust plate from the upper shaft; and spherical thrust-bearing rings interposed between the bearing carrying plate and the axial thrust plate for flexibly supporting the axial thrust plate on the bearing carrying plate.

EDGAR G. JOHNSON.

REFERENCES CITED

The following references are of record in the file of this patent:

UNITED STATES PATENTS

| Number | Name | Date |
| --- | --- | --- |
| 477,625 | Detrick | June 21, 1892 |
| 1,356,860 | Fast | Oct. 26, 1920 |
| 1,610,758 | Downer | Dec. 14, 1926 |
| 1,666,494 | Hall | Apr. 17, 1928 |
| 1,770,744 | Morgan | June 15, 1930 |
| 1,835,506 | Linn | Dec. 8, 1931 |